United States Patent
Heubel et al.

(10) Patent No.: US 7,450,961 B1
(45) Date of Patent: Nov. 11, 2008

(54) PORTABLE COMMUNICATION DEVICE INTERFACE TO A PROJECTION DISPLAY

(75) Inventors: Michael L. Heubel, Marietta, GA (US); Andrew W. Clegg, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 437 days.

(21) Appl. No.: 09/854,723

(22) Filed: May 14, 2001

(51) Int. Cl.
H04M 1/00 (2006.01)

(52) U.S. Cl. .................. 455/556.1; 455/566; 455/569.1; 455/569.2; 379/420.01

(58) Field of Classification Search .................. 455/566, 455/550.1, 569.1, 569.2, 575.9, 345, 556.1; 379/420.02, 420.03, 420.04, 420.01
See application file for complete search history.

(56) References Cited

U.S. PATENT DOCUMENTS

| | | | |
|---|---|---|---|
| 5,509,048 A * | 4/1996 | Meidan et al. ............... 455/564 |
| 6,115,618 A * | 9/2000 | Lebby et al. ................. 455/566 |
| 6,219,560 B1 * | 4/2001 | Erkkila et al. ................ 455/557 |
| 6,339,700 B1 * | 1/2002 | Tsai ........................... 455/90.3 |
| 6,377,825 B1 * | 4/2002 | Kennedy et al. .......... 455/569.2 |
| 6,489,934 B1 * | 12/2002 | Klausner ..................... 345/1.1 |
| 2002/0066115 A1 * | 5/2002 | Wendelrup ................... 725/153 |
| 2002/0068605 A1 * | 6/2002 | Stanley ........................ 455/556 |
| 2002/0072390 A1 * | 6/2002 | Uchiyama .................... 455/557 |
| 2002/0115477 A1 * | 8/2002 | Singh .......................... 455/566 |

OTHER PUBLICATIONS

"Heads-Up Displays—Technology Evaluation"; www.stanford.edu/~joshuas/hud/; Sep. 22, 2000.

* cited by examiner

Primary Examiner—Nghi H Ly
(74) Attorney, Agent, or Firm—Parks Knowlton LLC; Paul E. Knowlton, Esq.

(57) ABSTRACT

The present invention provides an interface between a portable communications device such as a cellular phone and the windshield display of an automobile, enabling textual or graphical data, delivered to the portable communications device to be displayed on the windshield. The interface also enables essential functions of the portable communications device to be integrated into the controls on the steering wheel.

8 Claims, 3 Drawing Sheets

PORTABLE COMMUNICATION DEVICE INTERFACE TO A PROJECTION DISPLAY

FIELD OF THE INVENTION

This invention relates generally to telecommunications interfaces and, in particular, to an apparatus for coupling a portable communication device, such as a cellular phone, to a projection display, such as an automobile's windshield display.

BACKGROUND OF THE INVENTION

Cellular phones have become significant players in a technological revolution. Since cellular phones first became available in the early 1980's, the number of people owning them has increased yearly by approximately 40%. It is estimated that there are currently in the range of 80 million cellular telephone users in the United States alone. Cellular phones themselves have metamorphized from heavy, cumbersome, expensive devices to light, miniature, inexpensive units. Changes in the physical features of cellular phones have encouraged changes in when, where and how people use cellular phones. Cellular phones and other portable communications devices have been key in making the populace more mobile and more sophisticated technologically.

PDA (personal digital assistant) is a term for any small mobile hand-held device that provides computing and information storage and retrieval capabilities for personal or business use. Many PDAs have a small keyboard; some have an electronically sensitive pad on which handwriting can be received. Typically, PDAs are used for scheduling, keeping an address book and note-entering. Additionally, many applications have been written for PDAs. Increasingly, PDAs are combined with telephones and paging systems and now are commonly used to send faxes and e-mail. Most PDAs can connect to other computers, either through telephone lines, radio waves or a computer cable. Many PDAs have PC card slots for attaching modems and other auxiliary devices.

Recent technological trends in mobile communications and computer hardware and software and the desire to work "on-the-road" have resulted in a move towards integration of technologies. Wireless communications can now be used to create a truly mobile office, including the receipt of e-mail, fax and Internet services in addition to telephone, voice mail and paging capabilities on the portable communications device. Frequently, these services provide a string of text that is displayed on the wireless unit.

The reduced size, reduced cost and increased functionality of the cellular telephone, and the increased prevalence and popularity of PDAs have resulted in the increased use of cellular telephones and PDAs by drivers while driving. Because of the public's concern for safety on the roadways, however, the use of cellular phones and PDAs while driving is a subject of some controversy and considerable public and legislative concern. One way that safety issues are being addressed is the incorporation into vehicle design of a projection display, such as a so-called "Heads Up Display" (HUD). A HUD typically displays information translucently on the windshield so that the driver can look at the display of computer generated information without taking his eyes off the road.

The inventors are unaware of any way, however, by which textual data from a cellular phone or other portable communications device can be displayed on the automobile's windshield using the vehicle's projection display system. It would be advantageous to have such a device so that textual information from a cellular telephone, PDA, or other portable communications device could be displayed in such a fashion that the driver would be able to see the information without taking his eyes from the road. Likewise a need exists to have a mechanism by which the portable communications device is controlled, to be located in a site where the controls can be activated without the driver's eyes leaving the road.

SUMMARY OF THE INVENTION

The present invention addresses the aforementioned needs by providing an interface between a portable communications device such as a cellular phone or personal digital assistant (PDA), and a remote projection display of a vehicle, in which a display is typically projected upon a vehicle's windshield. The interface enables textual or graphical data (information) delivered to the portable communications device to be displayed on the windshield of a vehicle. The interface includes at least one input port that accepts information from a portable communications device and at least one output port that outputs information to the projection display. The interface may include a data formatter that converts the information received from the portable communications device into a form the projection display can display. The interface may also enable control of essential functions of the portable communications device to be integrated into controls on the steering wheel. The interface may also be adapted to interface with a hands-free-kit.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific apparatus and methods disclosed. In the drawings, like numbers refer to like elements throughout.

DETAILED DESCRIPTION OF PREFERRED EMBODIMENTS

Figure 1:
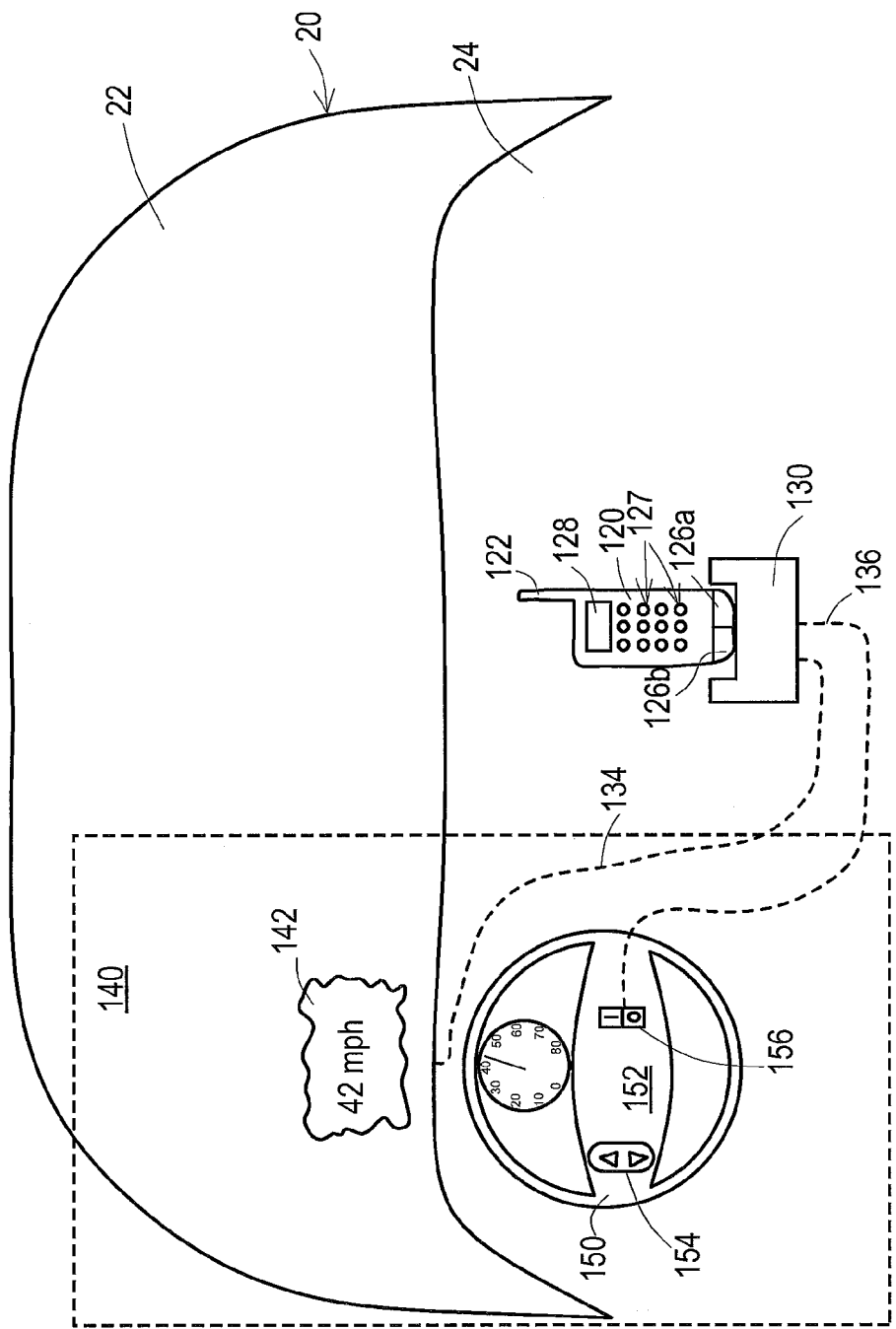
FIG. 1 depicts a preferred embodiment of a communications interface device according to the present invention communicatively connected to a personal communications device and a projection display device.
Figure 2:
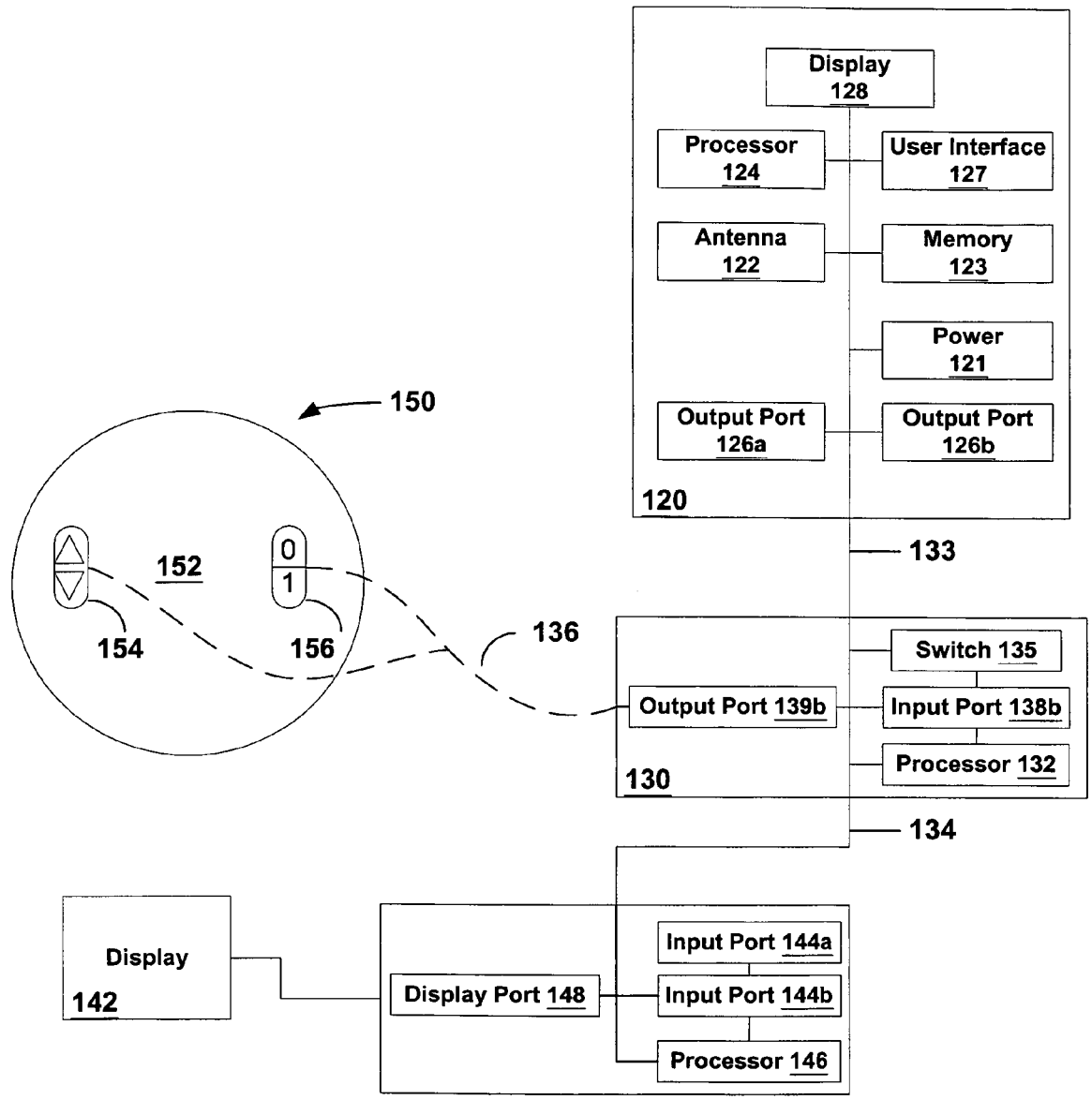
FIG. 2 provides block diagrams of the various components of a preferred embodiment of a system employing a communications interface device according to the present invention.

FIG. 1 depicts a preferred embodiment of a system according to the present invention for displaying information at a remote projection display 142, based on signals received by a portable communications device (PCD) 120. As shown in FIG. 1, PCD 120, which can be a cellular phone or personal digital assistant (PDA), for example, includes a signal receiving device 122, a PCD display 128, an information input interface 127, an audio output port 126a and a data output port 126b. As shown in FIG. 2, PCD 120 can also include a power supply 121, memory 123, and processor 124.

As is well known in the art, PCD 120 receives information-containing signals from a signal generating device, such as a cellular phone transmission tower, via signal receiving device 122, which is preferably an antenna. Antenna 122 is electrically coupled to processor 124, which converts the information contained in the signals received by antenna 122 into a format that is suitable for display on display 128. PCD 120 may, in addition, include a GPS (Global Positioning System) unit (not shown).

User input interface 127 includes a plurality of buttons via which the user can communicate with PCD 120. Such communication can include inputting commands such as toggling power to the PCD, entering alphanumeric data, or selecting certain, predefined functions. Such communication can also include scrolling through information displayed on display 128.

Output ports 126a and 126b enable PCD 120 to communicate with external devices. Preferably, output ports 126a and 126b are serial ports, although they can be parallel ports or USB ports depending on the PCD being used. Processor 124 can convert data received from antenna 122 into a format capable of interpretation by various external devices including but not limited to a hands-free kit, a computing device and a projection display device. Those skilled in the art will understand that such conversion routines are well known in the art and thus will not be explained further herein.

FIG. 1 also depicts a projection display system 140, such as an automobile's Heads Up Display (HUD), embedded in the vehicle's dashboard 24. Such systems are well known in the art. Projection display system 140 projects a translucent projection display 142 onto the windshield 22 of portion 20 of a vehicle (not shown), so that the driver can view the information on display 142 without having to take his eyes off the road.

As shown in FIG. 2, display system 140 can include one or more input ports 144a, 144b, etc., a processor 146, and a display port 148. Display system 140 can receive input data from one or more data providers via input ports 144a, 144b, etc. Typical data providers can be the vehicle's on-board navigation system, speedometer, or thermometer, for example.

Processor 146 processes the received data and causes information based on the received data to be displayed on projection display 142 in a user-readable format. For example, an automobile's speedometer might generate electrical signals that are conveyed to processor 146 through input port 144a or 144b, etc. Processor 146 determines the speed of the automobile from information contained in the received electrical signals, and causes a numeric representation of the automobile's speed to be projected, via display port 148, onto projection display 142 on the vehicle's windshield.

Preferably, projection display system 140 includes a user-control interface 152, which can be integrated into the vehicle's steering wheel 150. Control interface 152 can include scroll buttons 154 that allow the user to "scroll" up or down through the displayed information, and control buttons 156 that allow the user to toggle the display on and off, for example. It is preferred that control interface 152 is integrated into the vehicle's steering wheel 150 so that the user will not have to take his eyes off of the road while manipulating the display system.

According to the present invention, PCD 120 is coupled to projection display system 140 so that whatever is displayed at PCD display 128 can be displayed simultaneously or alternatively at projection display 142. In this way, the driver can view the information displayed at PCD display 128 without having to take his eyes off the road to do so. Accordingly, a system according to the present invention includes an interface device 130, which can be a housing or cradle, for example, that receives PCD 120 and couples PCD 120 to projection display system 140. The scroll controller may be electrically connected to the remote projection display device.

Cradle 130 can be tailored (i.e., sized and shaped) to receive PCD 120, and can include an appropriate connector 133 for coupling cradle 130 with PCD 120 such that cradle 130 can receive data output from PCD 120 via data output port 126b or both output ports 126a and 126b. Cradle 130 can also include an appropriate connector 134 for coupling cradle 130 (and, therefore, PCD 120) to projection display system 140. In a preferred embodiment cradle 130 is adapted to connect to an RS232 connector on projection display system 140 via wires or cables 134. In another embodiment connector 134 may be a vendor-specific wiring harness. In another embodiment this connection can be wireless.

Cradle 130 includes at least one input port 138b for receiving data from PCD 120 output data port 126b. Cradle 130 may also include an audio input port 138a (not shown) for receiving audio data from PCD 120 audio output port 126a. Cradle also includes at least one output port 139b for sending data to projection display system 140. Cradle 130 may in addition include an audio output port 139a (not shown) for outputting audio data.

In a preferred embodiment, a voltage control switch 135 senses when PCD 120 has been received into cradle 130. In another embodiment, circuitry in cradle 130 senses when PCD 120 has been received into cradle 130. In a preferred embodiment, data received from PCD 120 is transmitted to projection display device 140 whenever PCD 120 is received into cradle 130. In another embodiment, cradle 130 tells PCD 120 to send data to cradle 130.

As described above, PCD 120 receives information-containing signals from a signal-generation device. When PCD 120 is received into cradle 130, these signals are output from PCD 120, via output ports 126a and/or 126b, and data is received by interface 130, for example, through serial port 138b (for data). In one embodiment interface 130 may in addition include a serial port 138a (not shown) for receiving audio data from PCD 120 from audio output port 126a and a speaker (not shown) for outputting audio data received through serial port 138a. Interface 130 may in addition include a microphone (not shown) for receiving data that is to be sent back to the cell phone through an audio output port 139a (not shown) in cradle 130. Interface 130 transfers data from data serial port 138b to projection device 140 through connector 134 as discussed above.

In another aspect of the invention, controls 152 on a steering wheel 150 communicate with interface 130 via connector 136 to control aspects of how information received by projection display 140 from interface 130 is displayed on display 142. For example, controls 152 on steering wheel 150 may control scrolling of information received from interface 130.

Cradle 130 may have its own power source (not shown), such as a battery or an AC power converter, and/or may derive its power from the received cellular phone 120. Of course, if power use is more than minimal, it may be preferable that cradle 130 have its own power source so as not to excessively draw down the battery of such cellular phone 120 and/or provide a power boost to the cellular phone 120.

Cradle 130 can also include a processor 132 for converting data received from PCD 120 from one format into another or to perform other processing tasks, such as determining whether PCD 120 has been received into cradle 130. Such conversion processes are well known in the art and need not be described further. In an alternate embodiment, cradle 130 includes no processor.

In one embodiment cradle 130 connects to a hands-free kit. In such an embodiment, cradle 130 can be tailored (i.e., sized and shaped) to receive a hands-free kit, and can include an appropriate connector for coupling cradle 130 with hands-free kit. Hands-free kits are well known in the art and, therefore, are not described herein.

Figure 3:
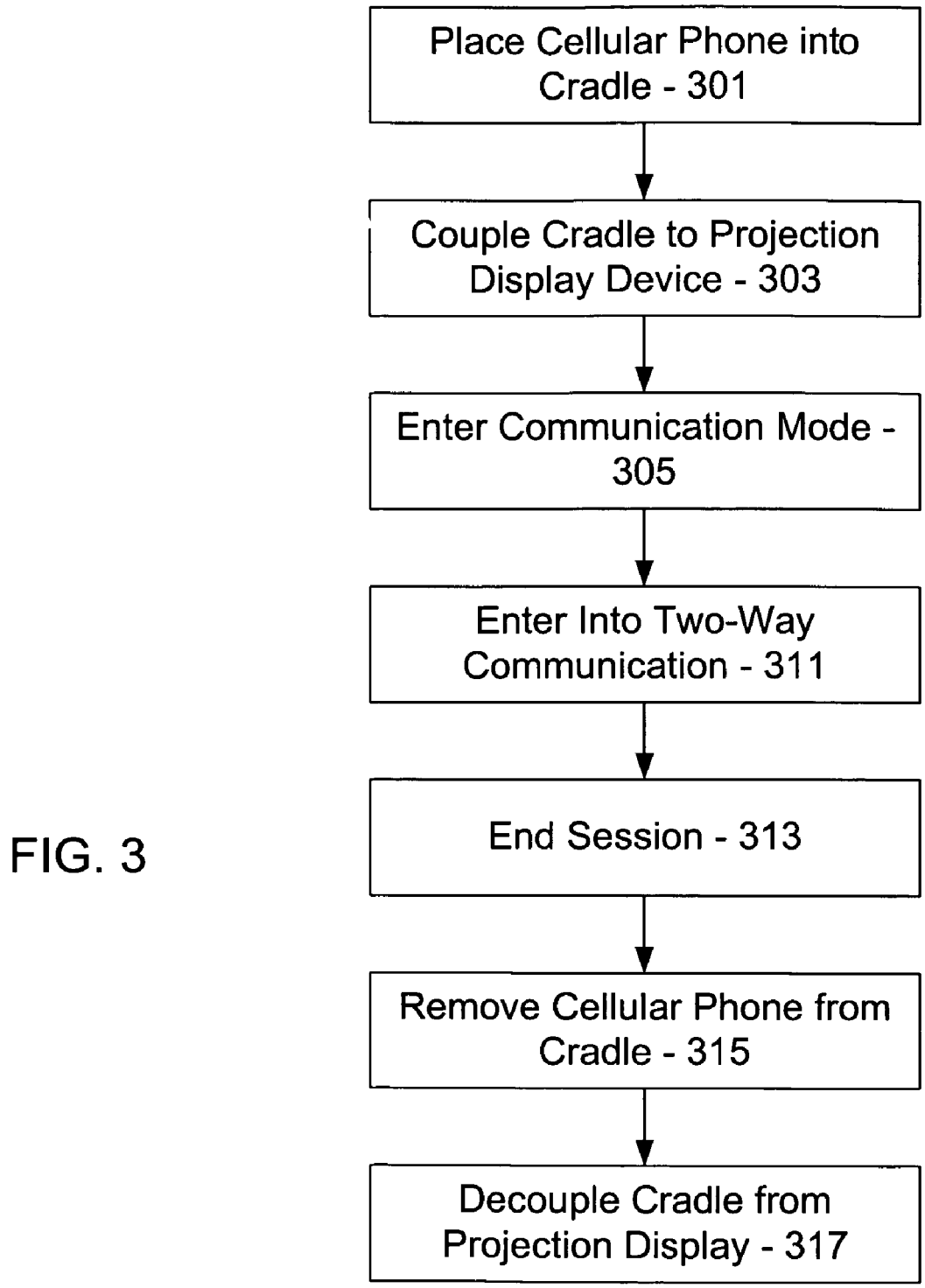
FIG. 3 is a flow chart depicting steps employed with the cellular phone, cradle and projection display of FIGS. 1 and 2 in accordance with one embodiment of the present invention.

In operation, referring now to FIG. 3, the user thereof appropriately places such portable communications device 120 into cradle 130 at step 301 so that serial ports 126a and/or 126b of portable communications device 120 is coupled with serial port connectors 138a and/or 138b of cradle 130. In addition, such user appropriately couples cradle 130 to projection display device 140 by way of connector 134 (step 303) and performs whatever appropriate coupling is necessary (connecting a cable, for example).

Preferably, portable communications device 120 and processor 124 therein are programmed or wired to sense a connection to cradle 130. Alternatively, the user may desire or be required to command cellular phone 120 to communicate with cradle 130. Thereafter, cellular phone 120 and processor 124 therein employ processor 132 to establish a connection wherein communication mode is entered (step 305) and communication with projection display device 140 by way of cradle 130 is established (step 311). By establishing two-way communication between cellular phone 120 and projection display device 140, additional incoming and outgoing data (such as new messages and other information) may be composed and exchanged therebetween.

When the user wishes to end the session, such user may command cellular phone 120 to do so (step 313). Cellular phone 120 may also automatically end the session after a pre-determined period of inactivity, among other things. The user can then remove cellular phone 120 from cradle 130 (step 315) and decouple cradle 130 from projection display 140 by way of connector 134 (step 317). Preferably, upon sensing removal from cradle 130, cellular phone 120 and projection display device 140 return to normal operation.

The programming necessary to effectuate the present invention, such as the programming run by the processor of the cellular phone 120, interface 130 and the programming run by the projection display device, 140 is readily apparent to those skilled in the relevant art.

As should now be understood, in the present invention, a method and apparatus are provided to support the display of textual information from a cellular phone on a projection display device. Changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

We claim:

1. Apparatus for displaying information from a portable communications device, having a data output port and a scrollable display, on a remote projection display device having a data input port, the apparatus comprising:

a first data port associated with a cradle for receiving the portable communications device, the first data port adapted to be coupled to the data output port of the portable communications device, the first data port for receiving remote data from the portable communications device, the remote data including remote audio data and remote visual data;

a second data port that is adapted to be coupled to the data input port of the remote projection display device, the second data port coupled to a voltage control switch that senses a voltage when the portable communications device is received by the cradle, wherein automatically, upon placement of the portable communications device into the cradle, the second data port provides to the remote projection display device a representation of the remote visual data received from and displayed by the portable communications device; and a processor coupled to the first data port and to the second data port, the processor establishing two-way communication between the portable communications device and the remote projection display device, wherein when a message is received at the portable communications device, then the processor exchanges the message with the remote projection display device and the remote projection display device displays the message, and after a predetermined period of inactivity then the processor ends two-way communication between the portable communications device and the remote projection display device, and when the portable communications device is removed from the cradle, then the processor commands the remote projection display device to resume displaying a speedometer input;

wherein the apparatus is configured to receive scrolling commands from a scroll controller, the scroll controller being adapted to cause the remote projection display device to provide a scrolling display of information that is simultaneously displayed on the scrollable display of the portable communications device such that the portable communications device and the remote projection display present the same information;

wherein the scroll controller comprises a scrolling control device that is integrated into an automobile steering wheel and is adapted to be electrically coupled to the remote projection display device and to the portable communications device such that the scrolling control device also controls the portable communications device and scrolls along the scrollable display of the portable communications device;

wherein the apparatus is also configured to receive commands from a display controller, the display controller being adapted to cause the remote projection display device to turn on and off the displayed information;

wherein the display controller also comprises a control device that is integrated into the automobile steering wheel and is adapted to be electrically connected to the remote projection display device;

wherein the cradle includes an audio serial port for receiving the remote audio data, a speaker for outputting the remote audio data, and a microphone for receiving audio data that is to be sent back through the portable communications device; and wherein the cradle is also adapted to couple to a hands-free kit, such that when the cradle couples to the hands-free kit the hands-free kit outputs the remote audio data and receives the audio data that is to be sent back through the portable communications device.

2. Apparatus according to claim 1, further comprising:

a data translator, coupled between the first data port and the second data port, that formats the remote visual data received from the portable communications device into a format from which the remote projection display device can provide a projected display.

3. Apparatus according to claim 1, wherein the portable communications device is an Internet appliance.

4. Apparatus according to claim 1, wherein the portable communications device is a cellular telephone.

5. Apparatus according to claim 1, wherein the portable communications device is a personal digital assistant.

6. Apparatus according to claim 1, wherein the remote projection display device provides the projected display on an automobile windshield.

7. Apparatus according to claim 6, wherein the remote projection display device is a heads-up display device that is integrated into an automobile.

8. Apparatus for hands-free communication using a portable communications device, the apparatus adapted to receive remote data from the portable communications device via a wireless telecommunications link, the portable communications device having an externally accessible data output port and the remote data including remote audio data and remote visual data, the apparatus comprising:

- a housing that is adapted to receive the portable communications device;
- a voltage control switch that senses a voltage when the portable communications device is received by the housing;
- a first interface for coupling the data output port of the portable communications device to the housing;
- a second interface for coupling the housing to a data input port of a remote projection display device;
- a processor for receiving the remote data from the portable communications device, converting the received remote visual data to a format displayable by the remote projection display device, and forwarding the converted remote visual data to the remote projection display device via the second interface for automatic display upon detection of placement of the portable communications device into the housing, the processor establishing two-way communication between the portable communications device and the remote projection display device, wherein when a message is received at the portable communications device, then the processor exchanges the message with the remote projection display device and the remote projection display device displays the message, and after a predetermined period of inactivity then the processor ends two-way communication between the portable communications device and the remote projection display device, and when the portable communications device is removed from the cradle, then the processor commands the remote projection display device to resume displaying a speedometer input;
- a serial port for receiving the remote audio data;
- a speaker for outputting the remote audio data; and
- a microphone for receiving audio data that is to be sent back through the portable communications device;
- wherein the apparatus is adapted to couple to a hands-free kit, such that when the apparatus couples to the hands-free kit the hands-free kit outputs the remote audio data and receives the audio data that is to be sent back through the portable communications device;
- wherein the portable communications device includes a scrolling capability, and the processor includes a scroll controller that receives scrolling commands from a remote scroll control device that is adapted to be integrated into an automobile steering wheel and adapted to cause the remote projection display device to provide a scrolling display of the converted remote visual data based on the scrolling commands that is simultaneously displayed on the portable communications device such that the portable communications device and the remote projection display present the same information, the scroll controller also controlling the portable communications device and scrolling along a display of the portable communications device;
- wherein the processor is configured to receive commands from a remote toggle controller, the remote toggle controller being adapted to cause the remote projection display device to toggle the display of the remote visual data between on and off states in response to actuation of the remote toggle controller;
- wherein the second interface is a wireless interface that is adapted to couple the housing to a corresponding wireless interface of the remote projection display;
- wherein the processor includes a data translator for the converting of the received remote visual data;
- wherein the first interface is a serial port connector and the second interface is a serial port connector; and
- wherein a connection between the first interface and the data output port of the portable communications device is achieved upon receipt of the portable communications device.

* * * * *